(12) United States Patent
Torregano

(10) Patent No.: US 12,512,743 B2
(45) Date of Patent: Dec. 30, 2025

(54) MOTOR-ALTERNATOR-MOTOR (MAM) SYSTEMS AND METHODS FOR USING SAME

(71) Applicant: Richard Paul Torregano, Baton Rouge, LA (US)

(72) Inventor: Richard Paul Torregano, Baton Rouge, LA (US)

(*) Notice: Subject to any disclaimer, the term of this patent is extended or adjusted under 35 U.S.C. 154(b) by 301 days.

(21) Appl. No.: 18/376,715

(22) Filed: Oct. 4, 2023

(65) Prior Publication Data

US 2024/0120820 A1   Apr. 11, 2024

Related U.S. Application Data

(60) Provisional application No. 63/418,221, filed on Oct. 21, 2022, provisional application No. 63/414,136, filed on Oct. 7, 2022.

(51) Int. Cl.
| | | |
|---|---|---|
| *H02K 47/18* | (2006.01) | |
| *H02K 7/14* | (2006.01) | |
| *H02K 7/20* | (2006.01) | |
| *H02K 47/02* | (2006.01) | |

(52) U.S. Cl.
CPC .......... *H02K 47/18* (2013.01); *H02K 7/14* (2013.01); *H02K 7/20* (2013.01); *H02K 47/02* (2013.01)

(58) Field of Classification Search
CPC ...... H02K 3/28; H02K 19/16; H02K 2213/09; H02K 7/1823; H02K 16/04; H02K 11/33; H02K 19/26; H02K 7/20; H02K 16/00; H02K 16/02; H02K 17/00; H02K 19/103; H02K 7/006; H02K 21/48; H02K 47/18; H02K 7/14; H02K 47/02; H02P 25/188; H02P 31/00; H02P 27/08; H02P 5/74; H02P 9/00; H02P 2103/20; H02P 2101/45; H02P 25/22; H02P 5/60; B60L 50/66; B60L 2220/14; B60L 2220/50; B60L 50/11; B60L 2220/12; B60L 7/14; F02B 63/04; F02N 11/04
See application file for complete search history.

(56) References Cited

U.S. PATENT DOCUMENTS 6,486,568 B1 * 11/2002 King ................ B60L 50/61
307/66

* cited by examiner

*Primary Examiner* — Antony M Paul
(74) *Attorney, Agent, or Firm* — Kean Miller LLP; Jessica C. Engler

(57) ABSTRACT

Like a transformer that can increase or decrease AC voltage or current by increasing or decreasing the turns-ratio of the transformer an amplification factor is developed. And like a transistor that can amplify/attenuate an electrical signal and by manipulating the hfe of the transistor, it could increase or decrease the amplification factor of the transistor. Likewise, the MAM unit, depending on the number of phases used, can amplify the power for a given output motor by increasing the number of phases of the output AC motor, which substantially reduces the amount of current an AC motor will draw for a specific amount of torque. By increasing the number of phases on an AC synchronous, asynchronous, axial, induction, or reluctance type motor, using alternating current, you can increase the efficiency, which implies an amplification factor of the motor thereby reducing the applied current required for a given amount of torque/speed.

15 Claims, 4 Drawing Sheets

| # of Phases | Degree of Separation | Input Motor (AC/DC) Power | Output Motor (AC type) Power | Efficiency Factor | Amps | % Decrease in current based on 173 amps |
|---|---|---|---|---|---|---|
| 1 |  | 41.51 KW - 55.6 Hp | 41.52 KW - 55.6 Hp | 1 | 173 | 0.00% |
| 3 | 120 | 24 KW - 32.2 Hp | 41.52 KW - 55.6 Hp | 1.73 | 100 | 42.20% |
| 6 | 60 | 12 KW - 16.1 Hp | 41.52 KW - 55.6 Hp | 3.46 | 50 | 71.0% |
| 8 | 45 | 8.6 KW - 11.5 Hp | 41.52 KW - 55.6 Hp | 4.83 | 35.8 | 79.3% |
| 9 | 40 | 7.5 KW - 9.81 Hp | 41.52 KW - 55.6 Hp | 5.67 | 30.5 | 82.5% |
| 10 | 36 | 6.74 KW - 9 Hp | 41.52 KW - 55.6 Hp | 6.15 | 28.1 | 83.7% |
| 12 | 30 | 5.57 KW - 7.46 Hp | 41.52 KW - 55.6 Hp | 7.46 | 23.2 | 86.6% |
| 15 | 24 | 4.37 KW - 5.86 Hp | 41.52 KW - 55.6 Hp | 9.51 | 18.2 | 89.5% |
| 18 | 20 | 3.6 KW - 4.83 Hp | 41.52 KW - 55.6 Hp | 11.34 | 15.3 | 91.2% |
| 20 | 18 | 3.29 KW - 4.41 Hp | 41.52 KW - 55.6 Hp | 12.63 | 13.7 | 92.1% |
| 24 | 15 | 2.74 KW - 3.67 Hp | 41.52 KW - 55.6 Hp | 15.10 | 11.4 | 93.4% |
| 30 | 12 | 2.18 KW - 2.92 Hp | 41.52 KW - 55.6 Hp | 19.03 | 9.1 | 94.7% |
| 36 | 10 | 1.85 KW - 2.47 Hp | 41.52 KW - 55.6 Hp | 22.86 | 7.57 | 95.6% |
| 40 | 9 | 1.63 KW - 2.19 Hp | 41.52 KW - 55.6 Hp | 24.94 | 6.94 | 96.1% |
| 45 | 8 | 1.42 KW - 1.91 Hp | 41.52 KW - 55.6 Hp | 28.61 | 5.04 | 96.6% |
| 60 | 6 | 1.2 KW - 1.61 Hp | 41.52 KW - 55.6 Hp | 38.16 | 4.53 | 97.1% |
| 90 | 4 | 0.64 KW - 0.85 Hp | 41.52 KW - 55.6 Hp | 57.27 | 3.02 | 98.3% |
| 120 | 3 | 0.52 KW - 0.7 Hp | 41.52 KW - 55.6 Hp | 76.38 | 2.26 | 98.8% |
| 180 | 2 | 0.26 KW - 0.35 Hp | 41.52 KW - 55.6 Hp | 171.23 | 1.01 | 99.4% |

Example: Efficiency of Phases based on 41.52 KW or 55.6 Hp & 173 Amps
P = (240 V AC) x (173 Amps) = 41.52 KW

FIGURE 4

MOTOR-ALTERNATOR-MOTOR (MAM) SYSTEMS AND METHODS FOR USING SAME

CROSS-REFERENCE TO RELATED APPLICATION

The present patent application claims the benefit to U.S. Provisional Patent Application Ser. No. 63/414,136, filed Oct. 7, 2022, and U.S. Provisional Patent Application Ser. No. 63/418,221, filed Oct. 26, 2022, each of which is incorporated herein by reference in its entirety.

BACKGROUND

Field of the Invention

Provided herein are motor-alternator-motor (MAM) systems and methods for using them for the reduction of current in AC motors, increased efficiency, and amplification of power, based on the number of phases and/or electromagnetic coils.

Description of Related Art

Three-phase motors are widely used in many mechanical and electromechanical devices because of their simplicity, reliability, and long service life. However, with the always-increasing power demands of these devices, there is a need for new systems and methods to increase motor efficiency and reduce current demand.

SUMMARY

Disclosed herein are motor-alternator-motor (MAM) systems and methods. In a specific embodiment, (FIG. 1) a motor-alternator-motor (MAM) system includes: batteries or battery supply; a variable frequency drive, where the battery supply is electrically linked with the variable frequency drive; a first motor, where the first motor is electrical linked with the variable frequency drive, where the first motor includes a stator with three (3) electrical phases and/or electromagnetic coils, and where the first motor has an input power; an alternator, where the alternator is mechanically linked with the first motor, and where the alternator includes a stator with a multiple number of electrical phases and/or electromagnetic coils; a pulse width modulated controller, where the pulse width modulated controller is electrically linked with the alternator and the batteries; and a second AC type motor (type of AC motor could be synchronous, asynchronous, axial, radial, inductance, or reluctance), where the second motor is electrically linked with the alternator, where the second motor includes a stator with a multiple number of electrical phases and/or electromagnetic coils, where the second motor has an output power, and where the motor-alternator-motor system has an amplification factor, with an increase in efficiency, and reduction in AC current, and all due to the number of phases/electromagnetic coils within the alternator and second motor.

In another specific embodiment, (FIG. 2) a motor-alternator-motor (MAM) system includes: batteries or battery supply; a direct current (DC) drive, where the battery supply is electrically linked with the direct current drive; a first motor, where the first motor is electrical linked with the direct current drive, where the first motor includes an permanent magnet brushless (PMBL) DC motor with an armature and stator, and where the first motor has an input power; an alternator, where the alternator is mechanically linked with the first motor, and where the alternator includes a stator with a multiple number of electrical phases and/or electromagnetic coils; a pulse width modulated controller, where the pulse width modulated controller is electrically linked with the alternator and the batteries; and a second AC type motor (type of AC motor could be synchronous, asynchronous, axial, radial, inductance, or reluctance), where the second motor is electrically linked with the alternator, where the second motor includes a stator with a multiple number of electrical phases and/or electromagnetic coils, where the second motor has an output power, and where the motor-alternator-motor system has an amplification factor, with an increase in efficiency, reduction in AC current, all due to the number of phases/electromagnetic coils within the alternator and second motor.

In another specific embodiment, (FIG. 3) a motor-alternator-motor (MAM) system includes: an internal combustion engine labeled as a first motor, where the first motor is mechanically coupled to the alternator, where the first motor includes an electrical starter connected to a small battery and where the first motor has an input power; an alternator, where the alternator is electrically linked to the DC generator via a pulse width controller, and where the alternator includes a stator with a number of electrical phases and/or electromagnetic coils; a pulse width modulated controller, where the pulse width modulated controller is electrically linked with the alternator and a DC generator; and a second motor, where the second AC motor is electrically linked with the alternator, where the second AC motor includes a stator with a number of electrical phases and/or electromagnetic coils, where the AC second motor has an output power, and where the motor-alternator-motor (MAM) system has an amplification factor, a reduction in AC current, an increase in efficiency, all due to an increase in the number of phases/electromagnetic coils employed.

In yet another specific embodiment, a method of increasing the efficiency of a multi-phase alternating current motor includes: providing a current to a multi-phase AC output motor, where the current is generated by a multi-phase alternator, where the alternator includes a stator with a number of electrical phases and/or electromagnetic coils, where a pulse width modulated controller is electrically linked with the alternator, and where the output AC motor includes a stator with a number of electrical phases and/or electromagnetic coils which provides a mechanical force to a drive shaft or belt and the drive shaft/belt is connected to a wheel, propeller, rotating drum, fan, or pump to perform a method of work.

BRIEF DESCRIPTION OF THE DRAWINGS

For the purposes of promoting an understanding of the principles of the present disclosure, reference is now made to the embodiments illustrated in the drawings, which are described below. The embodiments disclosed herein are not intended to be exhaustive or limit the present disclosure to the precise form disclosed in the following detailed description. Rather, the embodiments are chosen and described so that others skilled in the art can utilize their teachings. Therefore, no limitation of the scope of the present disclosure is intended for the invention may admit to other equally effective embodiments.

FIG. 4 is a table of efficiencies for a motor-alternator-motor system and method according to an embodiment of the present invention.

DETAILED DESCRIPTION

Figure 1:
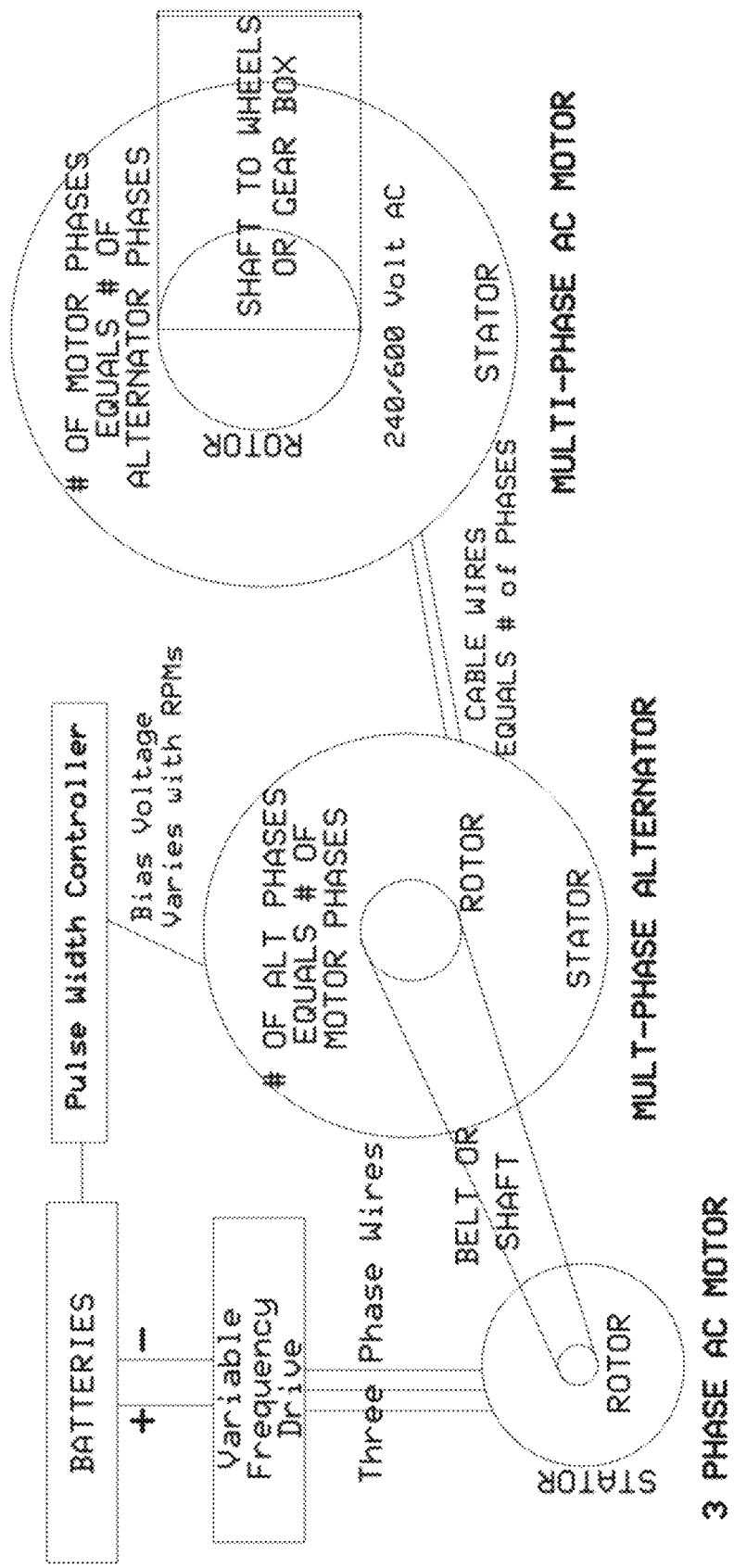
FIG. 1 depicts an embodiment of a motor-alternator-motor system and method, which is developed by batteries, a variable frequency drive, a small hp AC three-phase motor, a pulse width controller, a multi-phase alternator, and a multi-phase AC motor.
Figure 2:
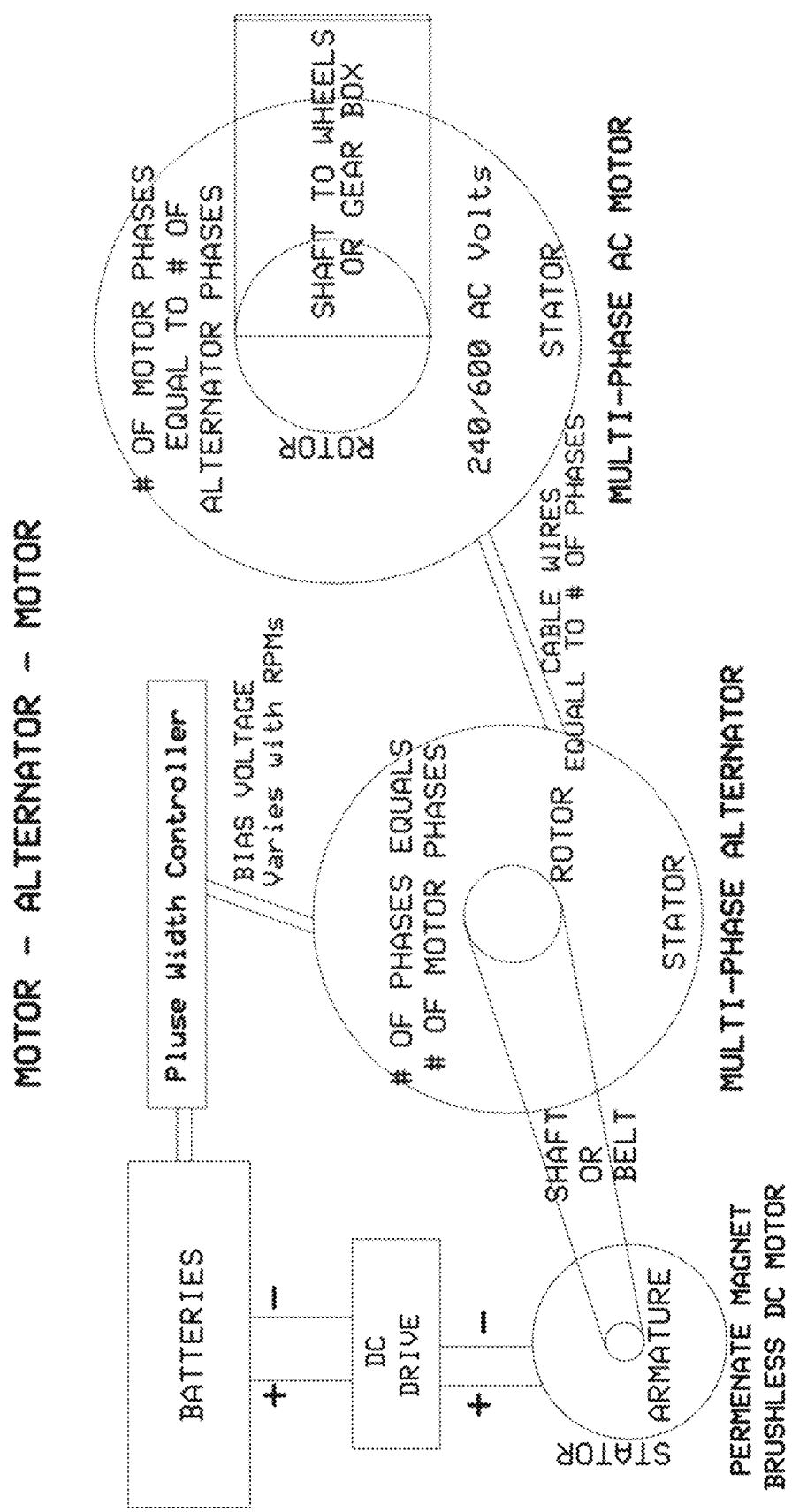
FIG. 2 depicts an embodiment of a motor-alternator-motor system and method, which is developed by batteries, a DC Drive, a brushless DC motor, a pulse width controller, a multi-phase alternator, and a multi-phase AC motor.
Figure 3:
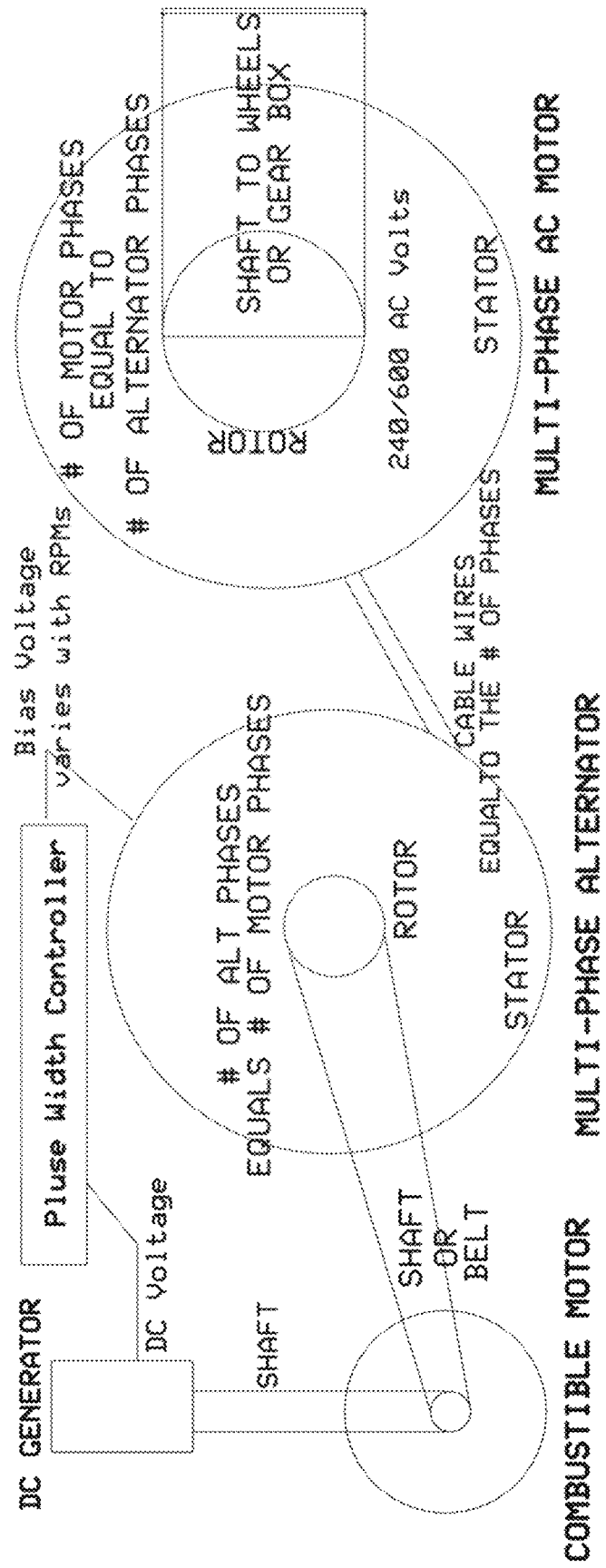
FIG. 3 depicts an embodiment of a motor-alternator-motor system and method, which is developed by an internal combustion engine, a DC generator, a pulse width controller, a multi-phase alternator, and a multi-phase AC motor.

FIGS. 1-3 show embodiments of the motor-alternator-motor (MAM) systems and methods. In one or more embodiments, motor-alternator-motor systems can include, but are not limited: one or more batteries; one or more variable frequency drives (VFDs), one or more direct current (DC) generators, one or more DC drive controllers, one or more multi-phase alternators, one or more multi-phase AC motors, one or more 3-phase alternating current (AC) motors, one or more permanent magnetic brushless (PMBL) DC motor, one or more pulse width modulated (PMW) controller, one or more internal combustion (IC) engines, one or more stators, one or more rotors, one or more armatures, one or more electromagnetic coils, one or more electrical phases, one or more wires, one or more shafts, and one or more gearboxes or mechanical output devices. The motor-alternator-motor systems and methods can include various initial power sources or prime movers. The power sources or prime movers can include, but are not limited to: batteries, electric motors, permanent magnetic brushless (PMBL) DC motors, and internal combustible motors/engines.

FIG. 1 shows an embodiment of a motor-alternator-motor system that can include a supply of batteries, where the battery supply is electrically linked with the variable frequency drive (VFD); a first motor, where the first motor is mechanically linked with a multi-phase alternator, where the first motor includes a stator with three (3) electrical phases and/or electromagnetic coils, and where the first motor has an input power; the multi-phase alternator, where the alternator is mechanically linked with the first motor, and where the alternator includes a stator with a number of electrical phases and/or electromagnetic coils, a pulse width modulated controller, where the pulse width modulated controller is electrically linked with the alternator and the battery supply; and a second multi-phase AC motor, where the second motor is electrically linked with the alternator, where the second motor includes a stator with a number of electrical phases and/or electromagnetic coils, where the second AC motor has an output power, and where the motor-alternator-motor system has an amplification factor, an increase in efficiency, and a reduction in current, which are predicated on the number of phases/electromagnetic coils implemented.

The motor-alternator-motor (MAM) system and methods can increase an output motor's efficiency while decreasing the amount of current, thereby providing amplification of power by implementing an increase in the number of electrical phases and/or electromagnetic coils (high poly-phase design) in a multi-phase alternating current motor. The multi-phase AC output motor is mechanically coupled to a shaft or gearbox while the electrical input of the AC output motor is wired to a multi-phase alternator with wires from the AC stator motor to the stator of the alternator and the alternator is mechanically coupled to a small three-phase AC motor, DC motor, or internal combustion engine. The efficiency can be based on the power and current between the first input motor/engine to that of the final AC output motor. The value of the amplification factor or the efficiency value can be determined by and can be inherent to the number of phases of the AC sine wave. As the number of electrical phases and/or electromagnetic coils is increased, a proportional amount of current decreases allowing as much as 99% less than a three-phase motor if the number of phases in an AC motor is increased to 180. This means that 180 wire connections are made from the 180-phase alternator to the 180-phase AC output motor. However, the number of phases can be as few as 4 phases to as many as 180 phases. In a four-phase AC motor, there would be four wires with a mechanical separation of 90 degrees between phases. In a 36-phase AC motor, there would be 36 wires and a mechanical separation of 10 degrees. Alternatively, for a 180-phase AC motor, there would be 180 wires with a mechanical separation of two (2) degrees between phases. By increasing the number of phases, the motor efficiency and amplification factor are increased, thereby reducing the current demand needed from the battery supply. This power amplification allows for a reduction in the number of batteries (battery supply) needed for the desired motor-alternator-motor (MAM) application. The desired MAM unit application demands can be expressed in horsepower or kilowatt (hp/kW) rating and/or the energy needed can be expressed in kilowatt-hours (kWh).

As the revolutions per minute (RPMs) of the input motor and/or first motor increase, the RPMs of the alternator increase, which results in the RPMs of the final output AC motor and/or second AC motor increasing. As the speed (RPMs) of the input motor and/or first motor and/or internal combustion engine is increased there is a proportional increase in speed (RPMs) of the output AC motor and/or second motor. The possible RPM range of the output AC motor can be from a low of 0 to a high of 16,000 RPMs, which can result in the input motor and/or first motor and/or internal combustion engine turning at 16,000 RPMs and, therefore, the alternator would rotate at 16,000 RPMs. Said another way, the frequency of the alternator can be 266.6 Hertz, resulting in the output AC motor and/or second motor rotating at 16,000 RPMs (266.6 Hertz). The increase in frequency is about 4.44 times greater than a conventional 60 Hertz AC motor. The motor-alternator-motor systems and methods can amplify the power for a given output motor by increasing the number of phases/electromagnetic coils of the output AC motor, thereby reducing the amount of current an AC motor will draw for a specific amount of torque.

The input energy source or prime-mover for the motor-alternator-motor (MAM) systems and methods can include, but is not limited to: one or more batteries, one or more AC motors, one or more internal combustion engines, and one or more permanent magnetic brushless DC motors. The fuel for the internal combustion engine can include, but is not limited to: gasoline, diesel, propane gas, and hydrogen gas. The power (hp or kW) of any of the prime movers can be based on the power of the final output AC motor and the number of phases used. In an embodiment, a variable frequency drive can be used to match the hp/kW and speed needed to supply the input power, while a DC drive is matched for the hp/kW and speed of the PMBL DC motor or an IC engine is selected to match the hp/kW and speed as required.

In an embodiment, the prime-mover can include a properly sized input AC motor and/or first motor, the necessary number of batteries to meet the kW/hp requirement based on the kW/hp of the final output multi-phase AC motor, and a variable frequency drive to control the speed, torque, and acceleration of the input AC motor and/or first motor. The power of an AC input motor can be determined by the output motor power (hp/kW) and its amplification factor, or efficiency factor, which is a function of the number of phases/electromagnetic coils. The final output AC motor and/or second motor can be chosen based on the power, speed, and torque desired.

In an embodiment, the motor-alternator-motor systems and methods can include a pulse width modulation controller that can regulate a variable AC voltage to the alternator allowing the AC output voltage to vary with the changing RPMs of the input AC motor. In an embodiment, a pulse width modulation controller (PWM) can be electrically linked to a battery supply, while the output of the PWM controller is electrically linked with an input of a multi-phase alternator, as shown in FIG. 1. As the RPMs of the input motor change, a proportional output from the pulse width modulation controller can be applied to the multi-phase alternator.

In an embodiment, the input energy source or prime-mover can include a permanent magnetic brushless (PMBL) DC motor with a sufficient number of batteries to meet the power and torque requirement of the design application. A DC drive controller can control the speed (RPMs) of the permanent magnetic brushless DC motor, as shown in FIG. 2. The pulse width modulation controller can be electrically linked to a battery supply, which can regulate the variable DC voltage to an alternator by allowing the DC output voltage to vary with the changing RPMs of the input DC motor. A DC permanent magnet brushless motor can be mechanically coupled to the multi-phase alternator and wires from the alternator would be connected to the final output multi-phase AC motor.

In an embodiment, the input energy source or prime mover can include an internal combustion engine of the proper size (hp/kW) and RPMs which is mechanically coupled to a DC generator. The DC generator is electrically linked to a pulse width controller, which can supply the variable DC bias voltage to the multi-phase alternator within the motor-alternator-motor system and method, as shown in FIG. 3. In this arrangement, there can be a battery, e.g., a 12V DC battery, that starts the internal combustible engine (approximately 5 to 15 hp).

The size/power (watts/hp) of the attached DC generator can be based on the voltage needed by the alternator. For example, the size/power (watts/hp) of the attached DC generator can be from a low of about 30 V, about 60 V, and about 90 V, to a high of about 540 V, about 600 V, and about 660 V. In another example, the size/power (watts/hp) of the attached DC generator can be from about 30 V to about 660 V, about 59 V to about 61 V, about 60 V to about 600 V, about 90 V to about 540 V, about 60 V to about 120 V, about 115 V to about 600 V, and about 120 V to about 580 V.

A pulse width modulation controller can be electrically linked with the DC generator to produce the varied output DC voltage to the alternator in proportion to the RPMs of the internal combustible engine. In an embodiment, the input energy source or prime-mover can include an AC motor which can be electrically linked to a variable frequency drive controller, which can be electrically linked with a battery supply and/or pulse width modulation controller. In another embodiment, a DC motor can be electrically linked to a DC drive controller, which can be electrically linked to a battery supply while a pulse width modulation controller is also electrically linked to the battery supply. In yet another embodiment, an internal combustion engine is mechanically coupled to a DC generator via a drive shaft or belt at one end of the shaft. The DC generator is electrically coupled to a pulse width modulated controller, which can provide the necessary variable DC bias voltage to the multi-phase alternator. The variable DC bias voltage can vary with the speed (RPMs) of the internal combustion engine.

The speed of an input energy source and/or input motors and/or first motors can be controlled by a potentiometer, rheostat, digital input signal, or 4 to 20 mA loop with a foot-pedal, or other mechanical or electrical devices. As the RPMs of the input energy source and/or input motor and/or first motor are increased, the RPMs of the output motor and/or second motor are increased, and conversely, as the speed of the input energy source and/or input motor and/or first motor is decreased the output motor and/or second motor speed is decreased. As the RPMs of the input energy source and/or first motor/engine vary, the applied variable DC voltage to the brushes of the multi-phase alternator varies accordingly. As the RPMs of the input energy source and/or first motor/engine increase the RPMs of the alternator increase and the RPMs of the output motor and/or second motor/engine increase. If the input energy source or prime mover is an internal combustion engine, the speed can be varied by varying the amount of fuel entering the engine.

The motor-alternator-motor (MAM) systems and methods can include an appropriate size (hp/kW) multi-phase alternator which could be used to supply the current/voltage to the multi-phase output AC motor. The number of phases and/or electrical coils of the alternator are paired with the AC output and/or second motor. Depending on the amount of current and voltage, speed, and torque needed for an equivalent hp/kW, an internal magnet within the alternator could be used to supply the current/voltage in the DC version of the MAM unit. For larger (hp/kW) alternators, a variable DC bias voltage via a set of brushes can be used for the multi-phase alternator to produce the necessary AC output voltage and current needed to supply the poly-phase AC output motor and/or second motor. The variable DC bias voltage/current (via DC pulse-width controller) electrical linked to the alternator could be supplied by the DC battery supply, the same DC battery supply used for the input AC/DC motor of the motor-alternator-motor (MAM) system and method. The multi-phase AC output motor, and/or second motor, can be mechanically coupled to a drive shaft or belt to drive/rotate one or more wheels, propellers, pumps, fans, pulleys, and rotating drums.

The second motor and/or final output multi-phase AC motor of the motor-alternator-motor (MAM) systems and methods can vary widely, depending upon the needs of the design engineer. For example, the second motor and/or final output multi-phase AC motor can be from a low of about 30 V, about 60 V, and about 90 V, to a high of about 600 V, about 900 V, and about 1,200 V. In another example, the second motor and/or final output multi-phase AC motor can be from about 30 V to about 1,200 V, about 60 V to about 600 V, about 59 V to about 61 V, about 60 V to about 90 V, about 80 V to about 120 V, about 60 V to about 540 V, about 115 V to about 600 V, and about 120 V to about 1,000 V.

In an embodiment, the motor-alternator-motor (MAM) system and method can include an input AC or DC motor, electrically linked with a variable frequency drive, DC controller, batteries, and pulse width modulated controller. In another embodiment, the motor-alternator-motor system and method can include: an internal combustion engine mechanically coupled to an alternator, the alternator electrically linked to a second AC motor, the second AC motor mechanically coupled to a shaft or belt, and the shaft/belt coupled to a mechanical rotating system.

By increasing the number of phases on an AC output motor and/or second motor an increase in efficiency can be achieved. Said another way, by increasing the number of phases and/or electromagnetic coils on an AC output motor and/or second motor a greater amplification factor of the motor can be achieved, thereby reducing the applied current needed for a given amount of torque and speed. For a 3-phase AC motor the efficiency would be about 1.73 or about 42% less current than that of a single-phase AC motor. For example, for a 240-volt, three-phase AC motor, that is pulling or supplying 100 amps, the total input power would be 24 kW while the available power in a wye-connected circuit would be about 1.73 greater or about 41.52 kW. This setup produces an increase in efficiency, with an amplification factor of about 1.73 (input: 24 kW-output: 41.52 kW so 41.52 kW/24 kW=1.73) because there are three hot phases with each phase being 120 degrees apart from each other. With the increase in the number of hot phases, there is a proportional reduction in the current, an increase in efficiency, and an increase in the amplification factor between input power and output power.

The motor-alternator-motor (MAM) system and method can include a low of 4 phases to a high of 180 phases. For example, the motor-alternator-motor system and method can include 4, 5, 6, 7, 8, 9, 10, 11, 12, 13, 14, 15, 16, 17, 18 19, 20, 21, and more, electrical phases and/or electromagnetic coils or up to 180 phases and/or electromagnetic coils. The motor-alternator-motor systems and methods can include a first motor, alternator, second motor, first stator, and second stator with a number of electrical phases and/or electromagnetic coils from a low of 4 to a high of 180 electrical phases and/or electromagnetic coils. The efficiency for a 6-phase AC motor would be about 3.46 or about 71% less current than a single-phase motor and about 50% reduction from a three-phase AC motor. In another example, a 240-volt, 6-phase AC motor pulling or supplying 50 amps (as indicated with an AC amp meter connect to one of the input power phases) the total input power would be 12 kW while the available power in a wye-connected output circuit would be about 3.46 greater or about 41.52 kW. Hence, there is increased efficiency with an amplification factor of about 3.46 from input to output power because there are six hot phases that are 60 degrees apart from each other. The efficiency for a 15-phase AC motor would be about 9.51 or about 89% less current than a single-phase AC motor and about an 81% reduction in current from a three-phase AC motor. For example, a 240-volt, 15-phase AC motor, pulling or supplying 18.2 amps (as indicated with an AC amp meter connected to one of the input power phases) the total input power would be about 4.36 kW while the available power in a wye-connected output circuit can be about 9.51 greater or about 41.52 kW. Hence, there is an increase in efficiency with an amplification factor of about 9.51 derived by the output power divided by the input power, resulting in a decrease in current and the amplification of power (41.52 kW/4.36 kW=9.51) because there are 15 hot phases which are 24 degrees apart from each other. The efficiency for a 36-phase motor would be about 22.51 or about 95% less than a single-phase motor and about a 92% reduction in current from a three-phase motor. For example, in a 240-volt, 36-phase motor, pulling or supplying 7.68 amps (as indicated with an Amp meter on one of the input power phases) the total input power would be about 1.84 kW while the available power in a wye-connected circuit would be about 22.51 greater or about 41.52 kW. There is an increase in efficiency and a decrease in current with an amplification factor of about 22.51 comparing input power to output power (41.52 kW/1.84 kW=22.51) because there are 36 hot phases with each hot phase is 10 degrees apart from each other.

The efficiency developed for the motor-alternator-motor (MAM) systems and methods can be based on the results from the value derived from the sine of the angle and the number of phases used. So, the efficiency of a three-phase AC voltage is 1.73, the efficiency of a 6-phase AC voltage is 3.46, the efficiency of an 18-phase AC voltage is 11.34, and the efficiency of a 36-phase AC voltage is 22.51, based on the sum of the values derived from the sine of the angles.

In an embodiment, the method of increasing the efficiency of an alternating current motor can include, but is not limited to: providing a current to a motor, where the current is generated by an alternator, where the alternator includes a stator with a number of electrical phases and/or electromagnetic coils, where a pulse width modulated controller is electrically linked with the alternator, and where the alternator is electrically linked to the multi-phase AC motor which includes a stator with a number of electrical phases and/or electromagnetic coils; which results in the output AC motor generating a mechanical force to a drive shaft or belt and the drive shaft/belt mechanically connected to wheels, propellers, pulleys, rotating drums, pumps, etc. in order to accomplish the work as specified by the design engineer.

Examples

To provide a better understanding of the foregoing discussion, the following non-limiting examples are offered. Although the examples can be directed to specific embodiments, they are not to be viewed as limiting the invention in any specific respect. Examples of the motor-alternator-motor systems and methods for using them are shown in Table 1.

TABLE 1

| Prime-Mover Input Motor Size/Final Output AC Motor Size - based on phase efficiency | | | | |
|---|---|---|---|---|
| Final Output Motor Size | | 100 hp/ | 200 hp/ | 300 hp/ |
| Phases | Efficiency | 74.6 kW | 149 kW | 224 kW |
| 3 | 1.73 | 58.8 hp/ | 116 hp/ | 176 hp/ |
| | | 43 kW | 86 kW | 130 kW |
| 6 | 3.46 | 29 hp/ | 57.8 hp/ | 87 hp/ |
| | | 21.6 kW | 43 kW | 65 kW |
| 10 | 6.15 | 16.3 hp/ | 32.5 hp/ | 49 hp/ |
| | | 12 kW | 24 kW | 36 kW |
| 15 | 9.51 | 10.5 hp/ | 21 hp/ | 31.5 hp/ |
| | | 7.8 kW | 15.6 kW | 23.4 kW |
| 36 | 22.51 | 4.5 hp/ | 9 hp/ | 13.3 hp/ |
| | | 3.3 kW | 6.6 kW | 10 kW |
| 180 | 160.4 | 0.6 hp/ | 1.25 hp/ | 1.8 hp/ |
| | | 0.46 kW | 0.9 kW | 1.4 kW |

FIG. 4 shows a table of efficiencies for various embodiments of the motor-alternator-motor (MAM) systems and methods. The table provides the necessary information to show how the increase in the number of phases reduces the size (KW or Hp) of the input power, while also reducing the amount of current required, yet produces the same output power available in KW or Hp. This implies, and the chart shows, there is an efficiency factor associated with the increase in the number of phases. The chart does not show there must be some type of mechanism or process that amplifies the input power to produce the output power by increasing in the number of phases. This process/mechanism is accomplished with a device called a MAM Unit (new utility patent). The MAM unit includes an input motor (AC or DC or IC engine) which is mechanically coupled to an alternator while the alternator is electrically coupled to an output AC type motor. Where the number of phases of the alternator and the number of phases of the AC type output motor are equal (#of alternator phases=#of phase in output AC type motor).

One of the ordinary skills in the art will readily appreciate that alternate but functionally equivalent components, materials, designs, and equipment can be used. The inclusion of additional elements can be deemed readily apparent and obvious to one of the ordinary skills in the art. Specific elements disclosed herein are not to be interpreted as limiting, but rather as a basis for the claims and as a representative basis for teaching one of the ordinary skills in the art to employ the present invention. Furthermore, all patents, test procedures, and other documents cited in this application are fully incorporated by reference to the extent such disclosure is not inconsistent with this application.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. It should also be appreciated that the numerical limits can be the values from the examples. Certain lower limits, upper limits, and ranges appear in at least one claim below. All numerical values are "about" or "approximately" the indicated value, and consider experimental error and variations that would be expected by a person having ordinary skill in the art.

Although the invention has been described with reference to the above examples, it will be understood that modifications and variations are encompassed within the spirit and scope of the invention. Accordingly, the invention is limited only by the following claims.

What can be claimed is:

1. A motor-alternator-motor (MAM) system comprising:
  a battery or batteries, or set of batteries;
  a variable frequency drive, wherein the battery supply is electrically linked/connected with the variable frequency drive;
  a first motor, wherein the first motor is electrically linked with the variable frequency drive, wherein the first motor comprises a stator with a number of electrical phases and/or electromagnetic coils and wherein the first motor has an input power;
  an alternator, wherein the alternator is mechanically linked with the first motor, and wherein the alternator comprises a stator with a number of electrical phases and/or electromagnetic coils;
  a pulse width modulated controller, wherein the pulse width modulated controller is electrically linked with the alternator and the battery supply; and
  a second motor, wherein the second motor is in electrically linked to the alternator, wherein the second motor comprises a stator with a number of electrical phases and/or electromagnetic coils, wherein the second motor has an output power, and wherein the motor-alternator-motor system has an amplification factor, an increase in efficiency, a reduction in current, all accomplished by increasing the number of phases.

2. The motor-alternator-motor system of claim 1, wherein the number of electrical phases and/or electromagnetic coils in the alternator and the second motor is six (6), and wherein the motor-alternator-motor system has an amplification factor of about 3.46.

3. The motor-alternator-motor system of claim 1, wherein the number of electrical phases and/or electromagnetic coils in the alternator and the second motor is thirty-six (36), and wherein the motor-alternator-motor system has an amplification factor of about 22.51.

4. The motor-alternator-motor system of claim 1 further comprising:
  a drive shaft.

5. A motor-alternator-motor (MAM) system comprising:
  a battery or batteries, or set of batteries;
  a direct current drive, wherein the battery supply is electrically linked/connected with the the direct current drive;
  a first motor, wherein the first motor, a DC motor is electrically linked with the direct current drive, wherein the first motor comprises a stator and an armature and wherein the first motor has an input power;
  an alternator, wherein the alternator is mechanically linked with the first motor, and wherein the alternator comprises a stator with a number of electrical phases and/or electromagnetic coils;
  a pulse width modulated controller, wherein the pulse width modulated controller is electrically linked with the alternator and the battery supply; and
  a second motor, wherein the second motor is in electrically linked to the alternator, wherein the second motor comprises a stator with a number of electrical phases and/or electromagnetic coils, wherein the second motor has an output power, and wherein the motor-alternator-motor system has an amplification factor, an increase in efficiency, a reduction in current, all accomplished by increasing the number of phases.

6. The motor-alternator-motor system of claim 5, wherein the number of electrical phases and/or electromagnetic coils in the alternator and the second motor is six (6), and wherein the motor-alternator-motor system has an amplification factor of about 3.46.

7. The motor-alternator-motor system of claim 5, wherein the number of electrical phases and/or electromagnetic coils in the alternator and the second motor is thirty-six (36), and wherein the motor-alternator-motor system has an amplification factor of about 22.51.

8. The motor-alternator-motor system of claim 5 further comprises:
  a drive shaft.

9. A motor-alternator-motor (MAM) system comprising:
  an internal combustion engine;
  a first motor/engine comprised of a rotary, diesel, or conventional internal combustion motor/engine, wherein the first motor/engine is mechanically coupled by a shaft or belt to DC generator at one end and to an AC alternator of the other end, and wherein the first motor/engine has an input power;
  an alternator, wherein the alternator is mechanically linked with the first motor, and wherein the alternator comprises a stator with a number of electrical phases and/or electromagnetic coils;

a pulse width modulated controller, wherein the pulse width modulated controller is electrically linked with the alternator and the DC generator; and a second motor, wherein the second motor is electrically linked with the alternator, wherein the second motor has output power, and wherein the motor-alternator-motor system has an amplification factor, based on the number of phases also resulting in a decrease of current.

10. The motor-alternator-motor system of claim 9, wherein the number of electrical phases and/or electromagnetic coils in the alternator and the second motor is six (6), and wherein the motor-alternator-motor system has an amplification factor of about 3.46.

11. The motor-alternator-motor system of claim 9, wherein the number of electrical phases and/or electromagnetic coils in the alternator and the second motor is thirty-six (36), and wherein the motor-alternator-motor system has an amplification factor of about 22.51.

12. The motor-alternator-motor system of claim 9 further: a drive shaft.

13. A method of increasing the efficiency of an alternating current motor comprising:

a multi-phase AC output motor providing a current, wherein the current is generated by an alternator, wherein the alternator comprises a stator with a number of electrical phases and/or electromagnetic coils, wherein a pulse width modulated controller is electrically linked with the alternator, and wherein the first motor comprises a stator, with a number of electrical phases and/or electromagnetic coils, and/or rotor, and/or armature; and/or IC engine and providing a mechanical force to a drive shaft, wherein the output motor generates the mechanical force.

14. The method of claim 13, wherein the number of electrical phases and/or electromagnetic coils in the stator in the alternator and motor is 6.

15. The method of claim 13, wherein the number of electrical phases and/or electromagnetic coils in the stator in the alternator and motor is 36.

* * * * *